United States Patent [19]

Kedar et al.

[11] Patent Number: 6,054,325
[45] Date of Patent: *Apr. 25, 2000

[54] METHOD AND APPARATUS FOR TRANSFERRING AND COMBINING DISTINCT CHEMICAL COMPOSITIONS WITH REAGENTS

[75] Inventors: Haim Kedar, Palo Alto; Jeffrey H. Sugarman, Los Altos, both of Calif.; Alastair A. Binnie, London, United Kingdom; Ronald W. Barrett, Saratoga, Calif.

[73] Assignee: Glaxo Wellcom Inc., Research Triangle Park, N.C.

[*] Notice: This patent is subject to a terminal disclaimer.

[21] Appl. No.: 08/887,141

[22] Filed: Jul. 2, 1997

Related U.S. Application Data

[63] Continuation-in-part of application No. 08/753,808, Dec. 2, 1996, abandoned.

[51] Int. Cl.[7] .......................... G01N 33/00; G01N 21/00
[52] U.S. Cl. .......................... 436/178; 436/94; 436/180; 422/100; 422/70
[58] Field of Search .............................. 422/99, 100, 101, 422/102, 103, 104, 56, 58, 70; 436/94, 180, 501, 508, 178; 435/6, 91

[56] References Cited

U.S. PATENT DOCUMENTS

| | | | |
|---|---|---|---|
| 4,111,754 | 9/1978 | Park | ....................................... 499/99 X |
| 4,493,815 | 1/1985 | Ferwood et al. | . |
| 4,526,690 | 7/1985 | Kiovsky et al. | . |

(List continued on next page.)

FOREIGN PATENT DOCUMENTS

| | | |
|---|---|---|
| 1 304 916 | 7/1992 | Canada . |
| 0 403 679 | 12/1990 | European Pat. Off. . |
| 0 787 527 | 8/1997 | European Pat. Off. . |

(List continued on next page.)

OTHER PUBLICATIONS

J. R.Schullek et al. *Anal. Biochem.* 1997, 246, 20–29.

This reference is a picture of HP 7686 Solution–Phase Synthesizer by Hewlett Packard.

(List continued on next page.)

*Primary Examiner*—Arlen Soderquist
*Attorney, Agent, or Firm*—Darin J. Gibby; Lauren L. Stevens

[57] ABSTRACT

The invention provides exemplary systems, methods, and apparatus for distinctly allocating liquids containing chemical compositions or compounds to known locations in an organized manner so that assays may be performed on the compositions, or so that the chemical compositions may be combined with other distinct chemical compositions or reagents prior to evaluation. In one exemplary embodiment, the invention provides a fluid transfer system which comprises a donor member having a plurality of separate regions. At least some of the regions contain at least one chemical composition, with each chemical composition being distinct from any other chemical composition in the donor member. An acceptor member is also provided and includes a plurality of defined locations which are each adapted to receive a liquid medium. A transfer mechanism is provided to systematically transfer at least some of the chemical compositions from the donor member regions to at least some of the acceptor member locations such that the locale of each transferred chemical composition within the acceptor member is known. Further, each of the acceptor member locations has a volume that is less than about 500 $\mu$l. In this way, a large number of acceptor member locations may be provided within a single system to efficiently transfer, in parallel fashion, large numbers of chemical compositions from the donor member to the acceptor member where evaluation or further processing of the chemical compositions may proceed.

10 Claims, 11 Drawing Sheets

U.S. PATENT DOCUMENTS

| | | |
|---|---|---|
| 4,598,049 | 7/1986 | Zelinka et al. . |
| 5,108,704 | 4/1992 | Bowers et al. . |
| 5,147,608 | 9/1992 | Hudson et al. . |
| 5,219,528 | 6/1993 | Clark . |
| 5,273,718 | 12/1993 | Skold et al. ............................. 422/101 |
| 5,288,464 | 2/1994 | Nokihara . |
| 5,324,483 | 6/1994 | Cody et al. . |
| 5,340,474 | 8/1994 | Kauvar .................................. 422/70 X |
| 5,356,596 | 10/1994 | Nokihara et al. ........................ 422/131 |
| 5,384,261 | 1/1995 | Winkler et al. . |
| 5,472,672 | 12/1995 | Brennan .................................. 422/131 |
| 5,503,805 | 4/1996 | Sugarman et al. . |
| 5,516,491 | 5/1996 | Kath et al. . |
| 5,529,756 | 6/1996 | Brennan .................................. 422/131 |
| 5,538,694 | 7/1996 | Delius .................................... 422/131 |
| 5,599,688 | 2/1997 | Grass . |
| 5,601,992 | 2/1997 | Lerner et al. ............................ 435/7.2 |
| 5,609,826 | 3/1997 | Cargill et al. . |
| 5,620,894 | 4/1997 | Barger et al. . |
| 5,622,699 | 4/1997 | Ruoslahti et al. . |
| 5,632,957 | 5/1997 | Heller et al. ............................ 422/68.1 |
| 5,650,489 | 7/1997 | Lam et al. ............................... 530/334 |
| 5,665,975 | 9/1997 | Kedar . |
| 5,688,696 | 11/1997 | Lebl . |
| 5,712,171 | 1/1998 | Zambias et al. . |
| 5,725,831 | 3/1998 | Reichler et al. .......................... 422/56 |
| 5,770,157 | 6/1998 | Cargill et al. . |
| 5,807,522 | 9/1998 | Brown et al. ............................ 422/50 |
| 5,843,767 | 12/1998 | Beattie .................................. 435/287.1 |
| 5,866,342 | 2/1999 | Antonenko et al. ...................... 435/7.1 |

FOREIGN PATENT DOCUMENTS

| | | | |
|---|---|---|---|
| WO90/02605 | 3/1990 | WIPO .............................. B01J 19/00 |
| WO91/07504 | 5/1991 | WIPO . | |
| WO92/02303 | 2/1992 | WIPO .............................. B01L 3/00 |
| WO94/05394 | 3/1994 | WIPO . | |
| WO94/14972 | 7/1994 | WIPO . | |
| WO95/11262 | 4/1995 | WIPO .............................. C08F 2/04 |
| WO96/03212 | 2/1996 | WIPO . | |
| WO96/16078 | 5/1996 | WIPO . | |
| WO97/09353 | 3/1997 | WIPO . | |
| WO97/10896 | 3/1997 | WIPO . | |
| WO97/42216 | 11/1997 | WIPO . | |
| WO97/45443 | 12/1997 | WIPO . | |
| WO97/45455 | 12/1997 | WIPO . | |
| WO98/08092 | 2/1998 | WIPO .............................. G01N 33/53 |

OTHER PUBLICATIONS

This reference is a picture of a MultiReactor™ Synthesizer by RoboSynthon, Inc.

This reference is a picture of a STEM Reacto–Stations™ Synthesizer by STEM Corporation.

This reference is a picture of an RS 1000 with air–cooled reflux module.

This reference is a picture of a RAM™ Synthesizer.

This reference is a picture of a Nautilus™ 2400 Synthesizer by Argonaut Technologies, Inc.

This reference is a picture of a Model 496 Multiple Organic Synthesizer by Advanced ChemTech.

This reference is a picture of MicroKans® and Micro-Tubes® by IRORI. These are used in an AccuTag™100 Combinatorial Chemistry System by IRORI.

This reference is a picture of an AutoSort™–10K Microreactor Sorting System by IRORI.

This reference is a picture of SOPHAS M Solid Phase Synthezier by Zinsser Analytic.

This reference is a picture of a Quest 210 Synthesizer by Argonaut Technologies.

This refers to pictures of an APOS 1200 Synthesizer by Rapp Polymere GmbH.

Baiga (1998), "Integrated Instrumentation for High–Throughput Organic Synthesis," Presented at Cambridge Healthtech Institute's Third Annual Symposium "High–Throughput Organic Synthesis", Mar. 5–6, Coronodo, California.

Baldwin et al. (1995), "Synthesis of a Small Molecule Library Encoded with Molecular Tags," J. Am. Chem. Soc. 117:5588–5589.

Bergot (1998), "Combinatorial Chemistry Workstation to Facilitate Pharmaceutical Development," Presented at Cambridge Healthtech Institute's Third Annual Symposium "High–Throughput Organic Synthesis", Mar. 5–6, Coronodo, California.

Brenner and Lerner (1992), "Encoded combinatorial chemistry," Proc. Natl. Acad. Sci. U.S.A. 89:5381–5383.

Campbell (1998), "Automating Solid–Phase Synthesis without Compromise," Presented at Cambridge Healthtech Institute's Third Annual Symposium "High–Throughput Organic Synthesis," Mar. 5–6, Coronodo, California.

Cargill et al. (1995), "Automated Combinatorial Chemistry on Solid Phase," Proceedings of the International Symposium on laboratory Automation and Robotics 1995. Zymark Corporation, Zymark Center, Hopkinton, MA, pp. 221–234.

Cargill et al. (1996), "Automated Combinatorial Chemistry on Solid Phase," Laboratory Robotics and automation, 8:139–148.

Czarnik and Nova (1997), "No static at all." Chemistry in Britain, Oct., pp. 39–41.

Daniels et al. (1990), "Membranes as novel solid supports for peptide synthesis," Peptides, Proceedings of the Eleventh American Peptide Symposium Jul. 9–14, 1998 (Rivier and Marshall, eds.), pp. 1027–1028.

DeWitt et al. (1996), "Combinatorial Organic Synthesis Using Park–Davis Diversomer Method," Acc. Chem. Res. 29:114–122.

DeWitt et al. (1994), "Diversomer technology: solid phase synthesis, automation, and integration for the generation of chemical diversity," Drug Dev. Res. 33:116–124.

DeWitt et al. (1996), "A modular System for combinatorial and Automated Synthesis" in "Molecular Diversity and Combinatorial Chemistry: Libraries and Drug Discovery. ACS Conference Proceedings Series" (Chaiken and Janda Eds.) pp. 207–218. American Chemical Society, Washington DC.

DeWitt et al. (1995), "Automated synthesis and combinatorial chemistry," current Opinion in Biotechnology 6:640–645.

DeWitt et al. (1993), "Diversomers": An approach to non-peptide, nonoligomeric chemical diversity. Proc. Natl. Acad. Sci. U.S.A. 90:6909–6913.

Floyd et al. (1997), "The Automated Synthesis of Organic Compounds—some Newcomers Have Some Success" in "Proceedings of the International Symposium on Laboratory Automation and Robotics 1996" pp. 51–76. Zymark Corporation, Zymark Center, Hopkinton, MA.

Frank (1994), "Spot–synthesis: An easy and flexible tool to study molecular recognition," Innovation and Perspectives in Solid Phase Synthesis, (Epton, ed.), pp. 509–512.

Frank et al. (1988), "Simultaneous multiple peptide synthesis under continuous folw conditions on cellulose paper discs as segmental solid supports," Tetrahedron 44:6031–6040.

Furka et al. (1991), "General method for rapid synthesis of multicomponent peptide mixtures," Int. J. Pept. Protein Res. 37:487–493.

Gooding et al. (1996), "Boosting the Productivity of Medicinal Chemistry Through Automation Tools, Novel Technological Developments Enable a Wide Range of Automated Synthetic Procedures" in "Molecular Diversity and Combinatorial chemistry: Libraries and Drug Discovery. ACS Conference Proceedings Series" (Chaiken et al.) pp. 199–206. American Chemical Society, Washington, DC.

Harness (1996), "Automation of High–Throughput Synthesis. Automated Laboratory Workstations Designed to Perform and Support Combinatorial Chemistry" in "Molecular Diversity and Combinatorial Chemistry: Libraries and Drug Discovery. ACS Conference Proceedings Series" (Chaiken et al.) pp. 188–198. American Chemical Society, Washington, DC.

Kerr et al. (1993), "Encoded combinatorial peptide libraries containing non–natural amino acids," J. Am. Chem. soc. 115:2529–2531.

Lam et al. (1991), "A new type of synthetic peptide library for identifying ligand–binding activity," Nature (London), 354:82–84.

Lashkari et al. (1995), "An automated multiplex oligonucleotide synthesizer: Development of high–throughput, low–cost DNA synthesis," Proc. Natl. Acad. Sci. USA 92:7912–7915.

Lebl et al. (1995), "One–bead–one–structure combinatorial libraries," Biopolymers, 37:177–198.

Myers et al. (1996), "Versatile method for parallel synthesis," Mehods Mol. Cell. Biol. (1996), 6:67–73.

Meyers et al., "Multiple simultaneous synthesis of phenolic libraries," ESCOM Science Publishers B.V., Leiden, The Netherlands, Copyright 1995, Mol. Diversity, 1:13–20.

"Millipore MultiScreen Assay System," Brochure, Millipore Corporation, Bedford, MA 01730, Rev. B Sep. 1991, 14 pages.

Mjalli (1997), "Application of Automated Parallel Synthesis" in "A Practical Guide to Combinatorial Chemistry" (Czarnik et al.) Pp. 327–354. American Chemical Society, Washington, DC.

Moran et al. (1995), "Radio Frequency Tag Encoded Combinatorial Library Method for the Discovery of Tripeptide–Substituted Cinnamic Acid Inhibitors of the Protein Tyrosine Phosphatase PTP1B," J. Am. Chem. Soc. 117:10787–10788.

Multiblock—Instrument for multiple and combinatorial synthesis—Brief Description and User's Manual, five pages.

Nestler et al. (1994), "A General Method for Molecular Taggin of Encoded Combinatorial Chemistry Libraries," J. Org. Chem. 59:4723–4724.

Ni et al. (1996), "Versatile Approach to Encoding combinatorial Organic Syntheses Using Chemically Robust Secondary Amine Tags," J. Med. Chem. 39:1601–1608.

Nicolau et al. (1995), "Radiofrequency encoded combinatorial chemistry," Angew. Chem. Int. Ed. 34:2289–2291.

Nielsen et al. (1993), "Synthetic methods for the implementation of encoded combinatorial chemistry," J. Am. Chem. Soc. 115:9812–9813.

Nikolaev et al. (1993), "Peptide–encoding for structure determination of nonsequenceable polymers within libraries synthesized and tested on solid–phase supports," Pept. Res. 6:161–170.

Ohlmeyer et al. (1993), "Complex synthetic chemical libraries indexed with molecular tags," Proc. Natl. Acad. Sci. U.S.A. 90:10922–10926.

Porco et al. (1998), "Automated chemical synthesis: chemistry development on the Nautilus 2400TM," Drugs of the Future 23:71–78.

Powers et al. (1998), "Personal Synthesizer for HTS," Genetic Eng. News, 18, No. 3, p. 14.

Rivero et al. (1997), "Equipment for the High–Throughput Organic Synthesis of Chemical Libraries" in "A Practical Guide to combinatorial chemistry" (Czarnik et al.) pp. 281–307. American Chemical Society, Washington, DC.

Sagian Incorporated Product Brochure, "Alchemy 2000 Automated Reaction System," three pages.

Salmon et al. (1993), "Discovery of biologically active peptides in random libraries: solution–phase testing after staged orthogonal release from resin beads," Proc. Natl. Acad. Sci. U.S.A. 90:11708–11712.

Stanchfield (1997), "FlexChem TM: A Modular System for High Throughput Synthesis of Small Molecules," Robbins Innovations, 5, No. 4, pp. 1–6.

Stanchfield (1998), "A Flexible, Modular System for Performing High–Throughput Synthesis of Small Molecules," Presented at Cambridge Healthtech Institute's Third Annual Symposium "High–Throughput Organic Synthesis", Mar. 5–6, Coronado, California.

SyRo Product Brochure for a reaction block for "Combinatorial Chemistry," one page.

Terrett et al. (1997), "Drug discovery by combinatorial chemistry—The development of a novel method for the rapid synthesis of single comounds," Chem. Eur. J. 3:1917–1920.

Whitten et al. (1996), "Rapid Microscale Synthesis, a New Method for Lead optimization Using Robotics and Solution Phase Chemistry: Application to the Synthesis and Optimization of Corticotropin–Releasing Factor Receptor Antagnoists," J. Med. Chem. 39:4354–4357.

METHOD AND APPARATUS FOR TRANSFERRING AND COMBINING DISTINCT CHEMICAL COMPOSITIONS WITH REAGENTS

CROSS REFERENCE TO RELATED APPLICATIONS

This application is a continuation-in-part application of U.S. application Ser. No. 08/753,808, now abandoned filed Dec. 2, 1996, the complete disclosure of which is herein incorporated by reference.

BACKGROUND OF THE INVENTION

This invention relates generally to the allocation of liquids containing various chemical compositions or compounds to locations where assays may be performed to evaluate the chemical compositions, or where the compositions may be combined with other substances, such as other chemical compositions or reagents, prior to evaluation. In one particular aspect, the invention is concerned with the analysis of chemical compositions which have been released from solid supports upon which the compositions were previously synthesized.

Processes for synthesizing various chemical compositions or compounds on solid supports, such as beads, are well known. For example, such processes are described in copending U.S. application Ser. No. 08/149,675, filed Nov. 2, 1993 now U.S. Pat. No. 5,503,805 and Ser. No. 08/146,886, filed Nov. 2, 1993 now U.S. Pat. No. 5,639,603, the disclosures of which are herein incorporated by reference. After synthesis, it is often desirable to analyze the compounds synthesized on the beads. One such process is by placing the beads into a plurality of wells containing a liquid. A portion of the compound on the beads is then released into the liquid. Assays are then performed on the liquids containing the compounds to evaluate the compounds.

Before performing the assays, it is often desirable to separate the beads from the liquids containing the released compounds. One such method is by providing a plurality of wells having open bottom ends. A filter is placed near each open end, with the beads resting upon the filter. After the compounds have been released, a valve at each bottom end is opened so that the liquids may drain through the bottom ends, with the beads remaining on the filter.

Such a method for separating the liquids from the beads is undesirable for a variety of reasons. One particular drawback is that a significant amount of the liquid remains within the filter. This becomes particularly problematic as the volume of the wells becomes smaller, resulting in too little of the liquid being transferred from the wells. Another drawback is that such a method provides no convenient way for selectively removing only a portion of the liquid from the wells so that additional assays can be performed on the remaining liquids or so that the compounds can be combined with other compounds for further evaluation.

Hence, it would be desirable to provide systems and methods to efficiently remove all, or, in some cases, only a selected portion of the liquids from the wells so that assays may be performed on the liquids.

Another challenging aspect of evaluating compounds released from solid supports is the amount of time required to perform assays in order to evaluate a particular compound. For example, if each well contains only a single bead, separate assays must be performed on the liquid removed from each well. In some cases, throughput may be increased by placing a plurality of beads into a single well and releasing the compounds. Assays may then be performed on the liquids removed from the wells. For wells producing a positive result, each bead within the well must then again be tested to evaluate the compound. This usually employs synthesizing the same compounds on the beads, releasing the compounds, and again performing assays. Such a procedure is both burdensome and time consuming, particularly if thousands of beads are involved in the process.

Hence, it would be further desirable to provide systems and methods for evaluating various compounds in a more efficient manner. It would be particularly desirable if such systems and methods effectively reduced the amount of time required to evaluate a particular compound. It would be further desirable if such systems and methods provided versatility so that various compounds may be combined with other substances prior to evaluation of the compounds.

SUMMARY OF THE INVENTION

The invention provides exemplary systems, methods, and apparatus for distinctly allocating liquids containing chemical compositions or compounds to known locations in an organized manner so that assays may be performed on the compositions, or so that the chemical compositions may be combined with other substances prior to evaluation. In some cases, the chemical compositions will be synthesized onto solid supports, such as beads. In such cases, the invention includes systems, methods and apparatus which facilitate both the handling of the solid supports and the release of the chemical compositions into the liquids prior to their allocation and subsequent evaluation.

In one exemplary embodiment, the invention provides a fluid transfer system which comprises a donor member having a plurality of separate regions. At least some of the regions contain at least one chemical composition, with each chemical composition being distinct or physically separated from any other chemical composition in the donor member. An acceptor member is also provided and includes a plurality of defined locations which are each adapted to receive a liquid medium. A transfer mechanism is provided to systematically transfer at least some of the chemical compositions from the donor member regions to at least some of the acceptor member locations such that the locale of each transferred chemical composition within the acceptor member is known. Further, each of the acceptor member locations has a volume that is less than about 500 $\mu$l. In this way, a large number of acceptor member locations may be provided within a single system to efficiently transfer, in parallel fashion, large numbers of chemical compositions from the donor member to the acceptor member where evaluation or further processing of the chemical compositions may proceed.

The chemical compositions will preferably be included within a liquid medium when transferred. In one particular aspect, the chemical compositions will be transferred while the solid supports remain within the donor member regions. In another particular aspect, the transfer mechanism comprises a valve that is disposed within each region. The valve may be opened to allow the liquid medium to flow from the donor member to the acceptor member. In one embodiment, the regions comprise wells which each have holes in a bottom end. The holes are preferably sized to hold the chemical compositions within the wells by capillary forces. To transfer the liquid, the wells may be subjected to centrifugation or a differential pressure.

In another particular aspect, the chemical compositions are included on solid supports which are held within the donor member regions so that at least some of the chemical compositions may be released into the liquid medium prior to being transferred. Such solid supports may include, for example, beads having the chemical compositions synthesized thereon, the inner walls of wells to which photolithographic techniques have been applied to synthesize the chemicals thereon, the inner walls of wells into which a chemical has been placed to react with the walls of the wells (e.g., plastic walls), and the like. In still another aspect, the donor member, the transfer mechanism and the acceptor member are isolated from the outside environment. In this manner, evaporation of the chemical compositions from the system will be greatly reduced, thereby allowing smaller volumes of liquids to be employed.

In still a further aspect, the acceptor member locations comprise holding vessels into which a common reagent may be introduced and combined with the chemical compositions from the donor member regions. The common reagent in one aspect is directly introduced into each holding vessel by fluid delivery lines. Alternatively, fluid delivery lines may be employed to interconnect various holding vessels so that several chemical compositions may be combined for analysis. In another alternative, the holding vessels may include a hole in a bottom end to facilitate the combination of several compositions from two or more holding vessels.

In yet another aspect, the acceptor member includes at least four locations per square centimeter. Preferably, the donor member regions each have a volume that is less than about 500 μl to correspond with the volume of the acceptor member locations. In one preferable aspect, each donor member region corresponds to each acceptor member region. Alternatively, more than one donor member region may correspond to a single acceptor member location.

In another embodiment, the invention provides a fluid transfer system which comprises a housing having at least one donor chamber which contains at least one chemical composition, that is held on a solid support. The housing further includes at least one acceptor chamber which is in fluid communication with the donor chamber. A transfer mechanism is employed to transfer at least some of the chemical composition from the donor chamber to the acceptor chamber. Further, the acceptor chamber has a volume that is less than about 500 μl.

In one particular aspect, the system includes a plurality of donor chambers and a plurality of acceptor chambers. Each acceptor chamber is in fluid communication with at least one of the donor chambers so that the chemical compositions, when held within a liquid medium, may be transferred between the chambers. In one exemplary aspect, the transfer mechanism comprises a centrifuge which spins the housing to transfer the chemical compositions from the donor chambers to the acceptor chambers. In another aspect, at least one of the donor chambers or the acceptor chambers includes a hole, and a pressure source is provided to transfer the chemical composition through the hole.

In another embodiment, the invention provides an exemplary method for combining distinct chemical compositions with reagents. According to the method, the chemical compositions are organized into separate regions of a donor member so that each region includes a distinct chemical composition. At least some of the chemical compositions are systematically transferred to individual locations within an acceptor member such that the locale of each transferred chemical composition within the acceptor member is known. The individual locations are configured so that they define a volume that is less than about 500 μl. A reagent is introduced into each location having one of the chemical compositions for analysis of the compositions.

In one exemplary aspect, the same reagent is delivered to each location. In another aspect, the compositions are transferred by passing at least some of each of the chemical compositions through valves. Preferably, the valves comprise holes within the donor member regions to allow the chemical compositions to be passed through the holes by application of a differential pressure or centrifugation.

In another aspect, the chemical compositions are included on solid supports which are held within the donor member regions. With this arrangement, at least some of the chemical compositions are released into a liquid medium prior to transferring the chemical compositions to the acceptor member locations. Preferably, the acceptor member includes at least four locations per square centimeter to facilitate the transfer and evaluation of large numbers of distinct chemical compositions. Optionally, the donor member regions and the acceptor member regions may be organized into two dimensional arrays to further facilitate transfer and evaluation. In still another aspect, the donor member regions may be aligned with the acceptor member regions before transferring the chemical compositions. In some cases, more than one donor member region will be aligned with a single acceptor member location.

In another exemplary embodiment, the invention provides a method for combining distinct chemical compositions with reagents, where the chemical compositions are initially provided on a plurality of solid supports. The solid supports are organized into separate donor chambers so that each donor chamber includes a distinct chemical composition. At least some of the chemical compositions are then systematically transferred to acceptor chambers which have a volume that is less than about 500 μl. The compositions are transferred in such a way that the locale of each transferred chemical composition within the acceptor member is known. A reagent is introduced to each acceptor chamber having one of the chemical compositions to evaluate the compositions.

In one exemplary aspect, the donor chambers and the acceptor chambers are included within a housing and are in fluid communication with each other. In this manner, the chemical compositions are transferred by spinning the housing. Preferably, at least some of the chemical compositions will be released into a liquid medium to facilitate the transfer of the chemical compositions to the acceptor chambers. In another aspect, at least some of either the donor chambers or the acceptor chambers include a hole, and a differential pressure is applied to the hole to transfer chemical compositions or reagents through the holes. In still another aspect, reagents are transferred from one acceptor chamber into another acceptor chamber or into one of the donor chambers.

Another exemplary device according to the invention comprises a plate having a plurality of wells, with each well having a bottom end. A capillary hole is disposed in at least some of the wells. The capillary hole is sized to be both smaller than an individual article and to hold the liquid containing the released compound within the well by capillary forces. In this way, the liquid will be maintained within the well until the capillary forces are overcome to remove the liquid from the well. At the same time, the hole is sufficiently small so that the article will remain within the well after the liquid has been removed.

In one exemplary aspect, the capillary holes are disposed in bottom ends of the wells. Preferably, the bottom ends of the wells are tapered to an apex to facilitate easier handling of the articles. Preferably, the holes will be offset from the apex to help prevent an article from becoming lodged in the hole. By providing such a hole, substantially all the liquid may be transferred from the wells. Alternatively, the capillary holes may be disposed in sides of the wells. In this manner the device is configured so that a known portion of the liquid will be transferred from each well after the capillary forces are overcome. This is particularly advantageous in the event that additional assays need to be performed to evaluate a compound. By maintaining a portion of the liquid within the wells, the remaining liquid may be employed to perform any additional assays.

In still another aspect, each well will preferably include only a single hole. However, it will be appreciated that a small number of holes could be included in each well.

The invention further provides an exemplary system for handling articles and comprises a top plate having a plurality of wells, with each well having a bottom end. A capillary hole is disposed in at least some of the wells. A bottom plate is further provided and includes a plurality of holding vessels. The number of wells equals or exceeds the number of holding vessels such that when the top plate is positioned above the bottom plate, each well is aligned with at least one of the holding vessels. In this way, a fluid from each well may be transferred into a corresponding holding vessel.

In one preferable aspect, each well is aligned with a separate holding vessel. Alternatively, multiple wells may be aligned with a single holding vessel so that the liquid contained in multiple wells may be pooled into a single holding vessel.

The capillary hole will preferably have a size which is smaller than the articles and which will hold a liquid used to release the various compounds from the articles within the well by capillary forces. The capillary hole will preferably be disposed in the bottom ends of the wells, but may alternatively be disposed on sides of the wells so that only a portion of the liquid will be removed. In one alternative, the hole may be configured to be "transitory", meaning that the hole is normally biased closed until subjected to centrifugation or a vacuum which causes the hole to open.

The system may be provided with a centrifuge which spins the plates to overcome the capillary forces and transfer the fluids from the wells to the holding vessels. Alternatively, a vacuum source may be provided to draw the fluids to the capillary holes. In another alternative, fluids may be removed from the wells by placing an absorbent material against each of the well bottoms. The capillary force of the absorbent material will preferably be higher than the capillarity of the well hole so that the fluids will be drawn through the holes and into the absorbent material. In this manner, fluids may be rapidly drained from the wells without the need for a centrifuge or vacuum manifold.

In an alternative aspect, the system further includes at least one reaction vessel, and a means is provided for transferring fluids from the holding vessels to the reaction vessel. One exemplary means for transferring comprises a plurality of pipettes. Preferably, each pipette will include a capillary tube at its distal end so that a known quantity of fluid may be transferred from each holding vessel to the reaction vessel. In this manner, a portion of the fluids from the holding vessels may be transferred into the reaction vessel where assays may be performed.

The invention further provides an exemplary method for evaluating compounds which have been synthesized on solid supports. According to the method, a top plate is provided having a plurality of wells, each of which includes a capillary hole. A bottom plate is also provided having a plurality of holding vessels. At least one article is introduced into some of the wells, with the article having a compound included thereon. The compound is then released from each article, and at least a portion of the released compounds are transferred through the capillary holes and into at least one of the holding vessels of the bottom plate. Assays are then performed on the compounds transferred from the wells to evaluate the compounds.

In one aspect of the method, only a single article is introduced into each well. With this arrangement, the released compound in each well may be transferred into a separate and corresponding holding vessel (i.e. a holding vessel which is aligned with only one well). Alternatively, the compounds in a plurality of wells may be pooled and transferred to a single holding vessel to form a combined compound within the holding vessel.

If the released compound in each well is transferred into a separate and corresponding holding vessel, substantially all of the released compound will preferably be transferred from each well. A portion of the compounds in each of the holding vessels may then be transferred into reaction vessels to form combined compounds within the reaction vessels. The assays are then performed on the combined compounds within the reaction vessels. If a positive result is produced with the assay on the combined compound, additional assays may then be performed on the compounds remaining in the corresponding holding vessels. In this way, the time required to evaluate the compounds may be greatly reduced since, if a positive result is not produced with the assay on the combined compound in the reaction vessel, it will not be necessary to perform individual assays on the compounds within each holding vessel. Further, if a positive result is produced in a reaction vessel, additional compounds do not need to be released from the articles since a portion of the removed compound will remain in each holding vessel and will be available for analysis.

If the released compound within some of the wells is transferred into a single holding vessel to form a combined compound, it is preferable to transfer only a portion of the released compound to the holding vessel. Assays may then be performed on the combined compound in the holding vessel. If a positive result is produced with the assay on the combined compound, additional assays may then be performed on the compounds remaining in each well. Alternatively, the released compounds within multiple wells may by pooled into two or more holding vessels to form a variety of combined compounds.

In an alternative aspect of the method, multiple articles are introduced into each of the wells. With this arrangement, the released compound in each well may be transferred into a separate and corresponding holding vessel, or the compounds from a plurality of wells may alternatively be pooled and transferred into a single holding vessel to form a combined compound. If the released compound in each well is transferred into a separate and corresponding holding vessel, assays will then preferably be performed within the holding vessels. Alternatively, the compounds within a plurality of holding vessels may be transferred into a reaction vessel to form a combined compound within the reaction vessel. Assays may then be performed on the combined compound within the reaction vessel. If a positive result is produced with the assay on the combined compound, additional assays may then be performed on remaining compounds within the holding vessels. This procedure increases throughput since only one assay may need to be performed on the combined compound within the reaction vessel if a positive result is not produced.

If the compounds within the wells are pooled into a single holding vessel to form a combined compound, only a portion of each compound will preferably be transferred from the wells. Assays may then be performed on the combined compound in the holding vessel. If a positive result is produced with the assay on the combined compound, additional assays may be performed on the compounds remaining in each well.

To remove only a portion of the released compounds from the wells, the capillary holes will preferably be provided on sides of the wells. The top plate may then be spun to transfer the portion of the released compounds from the wells. In an alternative aspect, the capillary holes may be placed at the bottom end of the wells and the wells may then be spun to centrifuge the released compounds through the capillary holes. By providing the holes at the bottom end of the wells, preferably substantially all of the liquid will be transferred from the wells by the centrifuge process.

When transferring the compounds from the holding vessel to the reaction vessel, a pipetting system will preferably be employed. In this manner, a known volume of the compounds may be transferred from each holding vessel into the reaction vessel.

DETAILED DESCRIPTION OF THE SPECIFIC EMBODIMENTS

Figure 1:
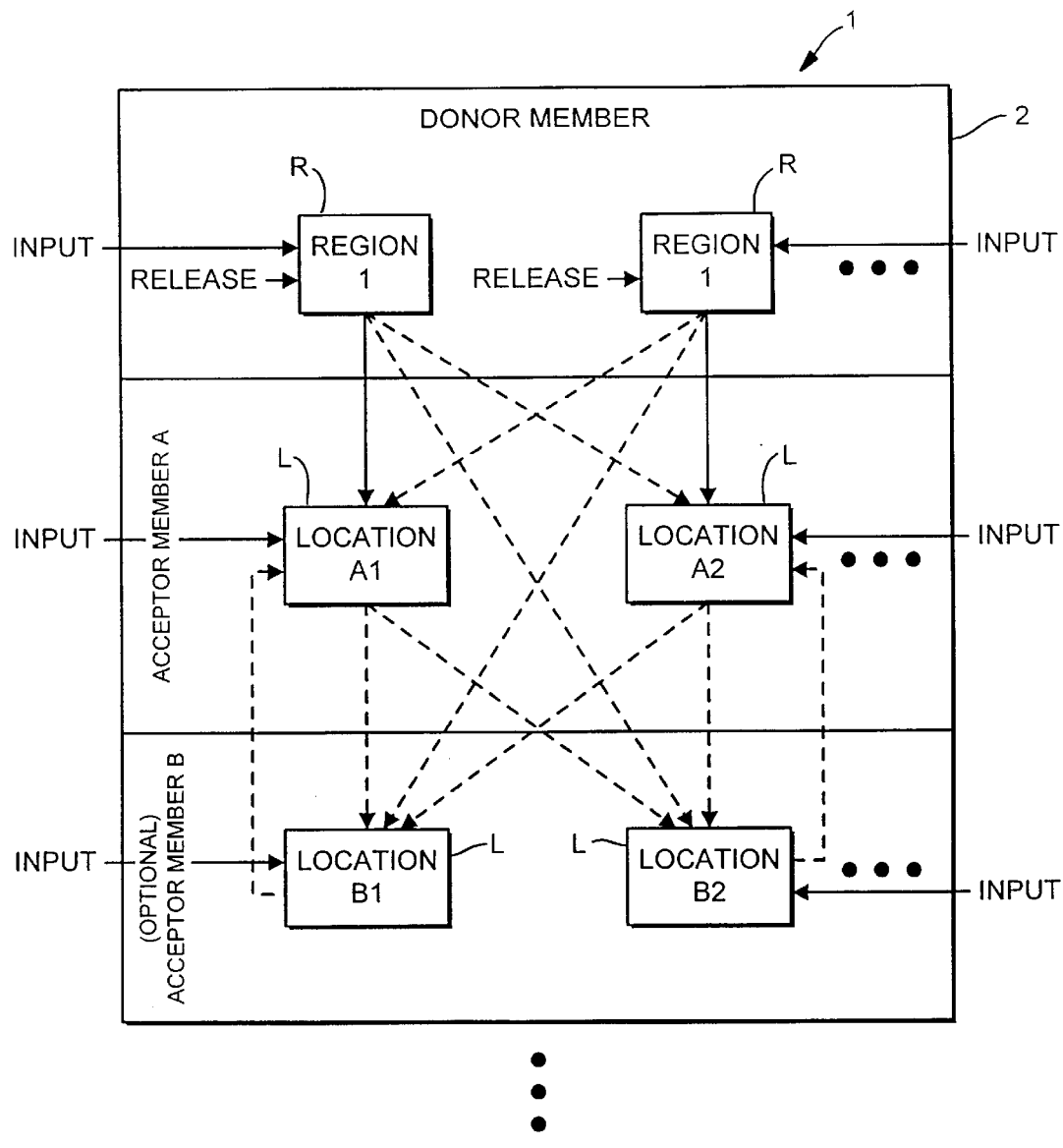
FIG. 1 is a schematic view of an exemplary system for allocating chemical compositions from a donor member to one or more acceptor members in order to facilitate evaluation of the compositions according to the invention.

The invention provides systems, methods and apparatus which are useful in helping to evaluate or identify various chemical compositions or compounds, particularly those which have previously been synthesized on solid supports. In particular, the invention provides for the distinct allocation of liquids which contain chemical compositions to known locations so that the chemical compositions may be assayed or combined with other substances, such as chemical compositions, reagents, particles, microorganisms, cells, other compounds, and the like for further evaluation. In cases where the compositions are included on solid supports, the invention also provides for the release of the compositions from the solid supports into a liquid. Following the release of the compositions, the liquids are separated from the solid supports so that the liquids may be allocated and evaluated. Such solid supports may include, for example, beads having the chemical compositions synthesized thereon, the inner walls of wells to which photolithographic techniques have been applied to synthesize the chemicals thereon, the inner walls of wells into which a chemical has been placed to react with the walls of the wells (e.g., plastic walls), and the like.

The beads to which the chemical compositions are synthesized are usually constructed of a polymer such as polystyrene and polyethylene glycol, and are commercially available from, for example, Nova Bio-Chem. These beads are small, typically on the order of about 5 $\mu$m to about 300 $\mu$m, more usually from about 80 $\mu$m to about 200 $\mu$m.

To release the various compounds from the beads, the beads are usually placed in wells in the presence of a liquid medium, such as water, ethanol, methanol, buffer, DMSO, and the like. The various compounds may then be released from the beads using any of a variety of processes, such as by photolysis, where they will be contained within the liquid medium.

In addition to providing for the separation of the liquids from the solid supports, the invention also provides various ways of increasing throughput so that greater numbers of compounds can be analyzed in a shorter amount of time. In some cases, throughput may be increased by decreasing the size of wells or chambers which are employed to store the liquids. For example, the volume of such wells or chambers will preferably be 500 $\mu$l or less, and more preferably about 100 $\mu$l or less, so that large numbers of wells or chambers may be organized into a single device, e.g., up to about 100 wells or more. Preferably, the invention will include at least four wells or chambers per square container. In this way, large numbers of evaluation processes may proceed in parallel to greatly reduce the time required for evaluating large numbers of distinct chemical compositions.

Throughput is also increased by providing efficient transport mechanisms to transfer the various fluids from location to location. For example, when wells or chambers are employed to hold the fluids, the wells may be interconnected with various valves (including micro-valves), tubing (or other fluid paths), by stacking the wells, and the like. In this way, the fluids may be systematically transferred from location to location using gravity, centrifugation, the application of positive or negative pressure, and the like.

Another advantage of the invention is that other fluids containing various substances may be introduced to any location within the system at any time to facilitate evaluation of the compounds. In this way, fluids containing other substances may be rapidly combined with the compounds in parallel fashion to facilitate evaluation.

In some cases, the wells will be open to facilitate easy introduction of various chemicals, substances, reagents, and the like into the wells. In other cases, the entire system will be closed, with the various fluids and substances being injected into the system without exposing the system to the outside environment. Closing of the system in this manner is particularly advantageous as volume sizes are decreased to help prevent evaporation of the fluids.

Referring now to FIG. 1, an exemplary system 1 for systematically transferring various distinct fluids to various known locations for evaluation will be described. System 1 comprises a donor member 2 and a plurality of acceptor members 3A and 3B, it being appreciated that additional acceptor members may also be included. Donor member 2 may be integrally formed with acceptor members 3A and 3B, or, alternatively, each of the various members may be removably attached to each other. Donor member 2 includes a plurality of regions R which are each configured to receive a distinct chemical composition. By "distinct" it is intended to mean that chemical compositions, such as, for example, compositions originating from solid supports, a collection of solid supports, and the like, are physically separated from each other when within a given region. One exemplary way for handling the chemical compositions is to synthesize them onto solid supports and then to place the solid supports into regions R (or to synthesize the chemical compositions directly onto regions R). Optionally, the chemical compositions may be externally input into regions R as shown.

Each region R is in fluid communication with a location L of acceptor member 3A. In some cases, each region R will be in fluid communication with only a single location L. Alternatively, system 1 may be configured so that each region R is in fluid communication with any or all of the locations L of acceptor member 3A. In this way, distinct chemical compositions may be transferred from regions R to any one, or a combination, of locations L. It will be appreciated that the transfer of the fluids having the chemical compositions will be regulated so that the final resting place of each chemical composition with the locations L will be known. Preferably, the chemical compositions will be transferred from the donor member regions (after being released from their solid supports) while the solid supports remain within the donor member regions. In this manner, the evaluation process is facilitated by providing an efficient way to separate the chemical compositions from the solid supports and to place the chemical compositions in known locations where analysis may occur.

As shown, acceptor member 3B also includes a plurality of locations L which may be configured to be in fluid communication with any of locations L of acceptor member 3A or regions R of donor member 2. In this way, fluids may be transferred in any direction between regions R, locations L of acceptor member 3A, and locations L of acceptor member 3B. The number of possible combinations may be increased by simply increasing the number of regions R and locations L.

Each of locations L will preferably include a substance that will be combined with the chemical compositions from the regions R in order to prepare the chemical compositions for evaluation or to begin the actual evaluation process. Such substances may be pre-stored within the locations L or may be input externally, as shown. Exemplary substances which may be stored and/or input include reagents, other chemical compositions, particles, microorganisms, cells, scintillant proximity assay (SPA) beads, and the like.

System 1 may be configured to be either an open system or a closed system. When open, the regions R and locations L will preferably comprise open wells into which substances may be directly introduced. When closed, each of the regions R and locations L will be interconnected by microchannels, by stacking the regions R over locations L, or the like. Various valves, including micro-valves, capillary holes, and other valves as described hereinafter, may be employed to regulate the transfer of fluids between the regions R and locations L using gravity, centrifugation, the application of positive or negative pressure, and the like. Further, external input sources will be provided for introducing various reagents, chemical compositions, and the like into the system through fluid paths or micro-channels-without exposing the system to the outside environment. In this way, the possibility of contamination and evaporation of the fluids will be greatly reduced. It will be appreciated that fluid introduction and transfer into and within the system may be controlled with a processor, e.g., to control application of pressure, the opening of valves, and the like.

Figure 2:
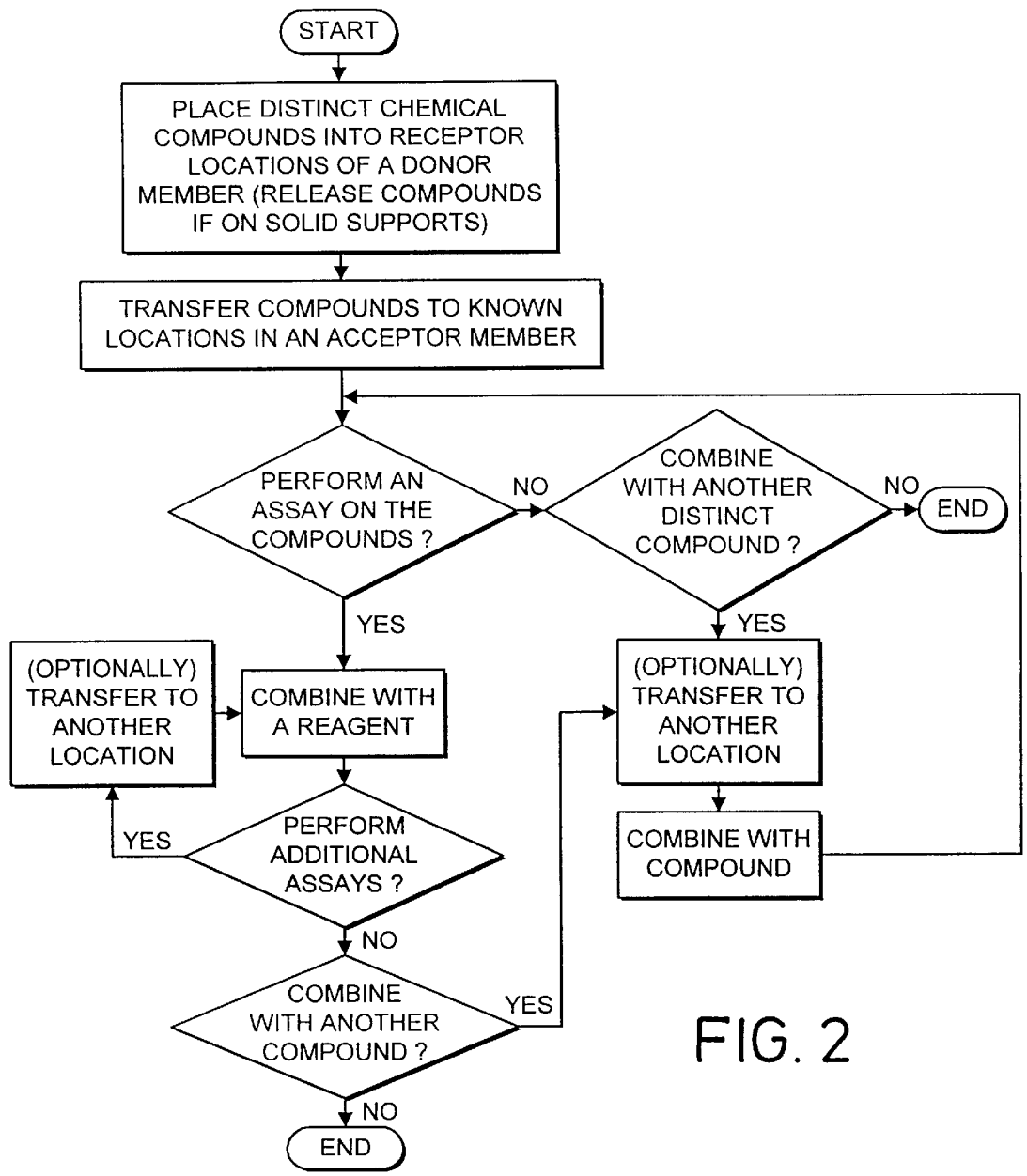
FIG. 2 is a flow chart illustrating one exemplary method for operating the system of FIG. 1 according to the invention.

Referring now to FIG. 2, an exemplary method for evaluating chemical compounds using the system of FIG. 1 will be described. Initially, chemical compounds are distinctly placed into the receptor locations or regions R of donor member 2. At least some of the compounds are transferred from the regions R to locations L in the acceptor member 3A such that it is known where each compound resides. Assays may then be performed on the compounds within the locations L by combining the compounds with a reagent. Optionally, additional assays may be performed by adding additional reagents. If desired, the compounds may be transferred to other locations, such as in acceptor member 3B, for evaluation.

Sometimes, it will be desirable to combine the compounds with other substances, including other compounds, particles, microorganisms, cells, and the like. This may occur either before or after various reagents have been added. If so, the method provides for the addition of such substances. Additional assays may then be performed on the compounds. Optionally, the compounds may be transferred to other locations L or regions R within the system to facilitate the additional of various substances or for evaluation.

Figure 3:
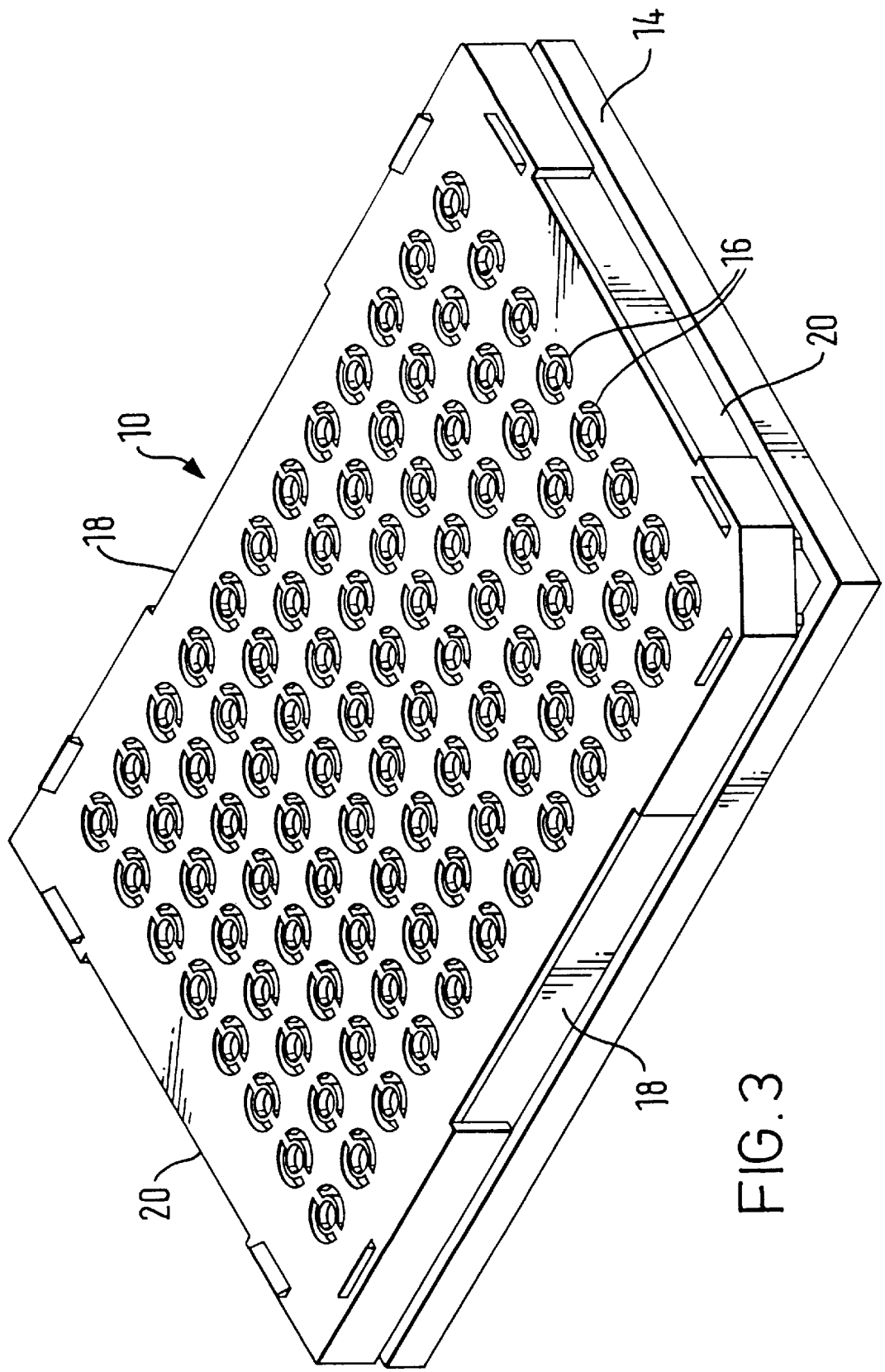
FIG. 3 is a perspective view of an exemplary system for separating a liquid from a plurality of solid supports upon which various compounds have been released into the liquid according to the present invention.

Referring now to FIG. 3, one exemplary system 10 for evaluating various chemical compounds will be described. System 10 is particularly useful in cases where compounds have been released from beads into a liquid medium. System 10 includes a top plate 12 and a bottom plate 14 (which may also function as an intermediate plate as described hereinafter with reference to FIGS. 4 and 5). Top plate 12 includes a plurality of wells 16 into which the beads and liquid medium are placed. As shown, top plate 12 includes 96 wells which are fashioned to be compatible with commercial processing equipment as is known in the art. However, it will be appreciated that any number of wells may be provided as required by a given procedure. Conveniently, clearance cuts 18 and 20 are provided to facilitate robotics employed to handle the plate.

Figure 4:
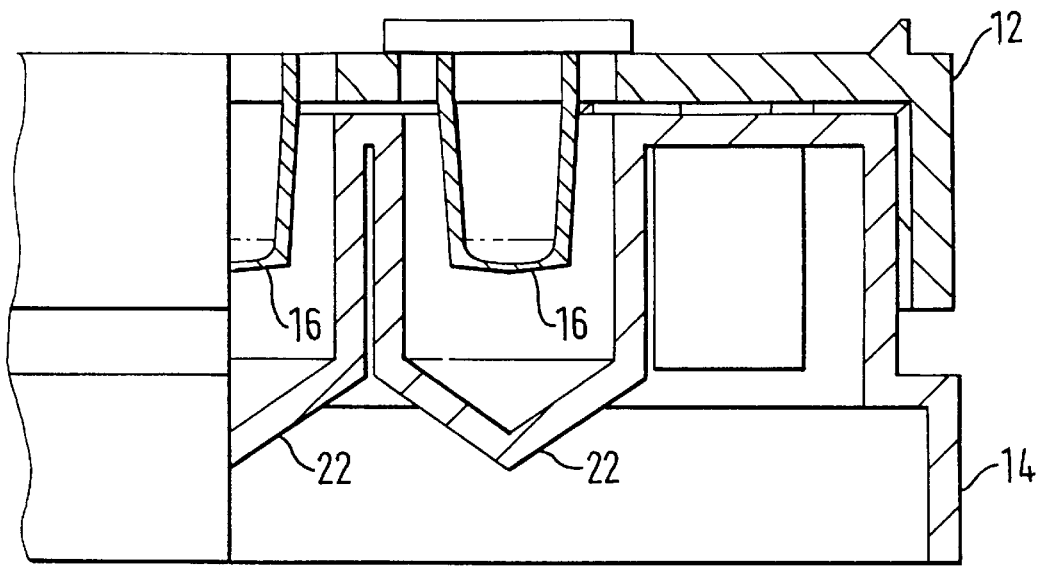
FIG. 4 is a cross-sectional side view of a portion of the system of FIG. 3.

Referring now to FIG. 4, construction of system 10 will be described in greater detail. Top plate 12 rests on bottom plate 14, with wells 16 of top plate being received into a plurality of holding vessels 22 in bottom plate 14. Each well 16 in top plate is received into a separate and corresponding vessel 22 in bottom plate 14. For example, if top plate 12 includes ninety-six or 864 wells, bottom plate 14 will include ninety-six or 864 holding vessels 22 so that each well 16 will be received into a separate holding vessel 22 when top plate 12 is placed on bottom plate 14. Top plate 12 may easily be separated from bottom plate 14 by lifting top plate 12 from bottom plate 14. In this manner, after a liquid medium has been transferred from wells 16 to holding vessels 22, plates 12 and 14 may be separated from each other so that the liquid medium can be further analyzed.

Bottom plate 14 will preferably be sized so that it is compatible with commercially available handling and processing equipment. Preferably, wells 16 will be detachable from top plate 12 to further aid in the analysis of the fluids. The volume between the bottom of wells 16 and a bottom end of holding vessels 22 will be sufficient so that it may receive the entire volume of liquid transported from wells 16.

Figure 5:
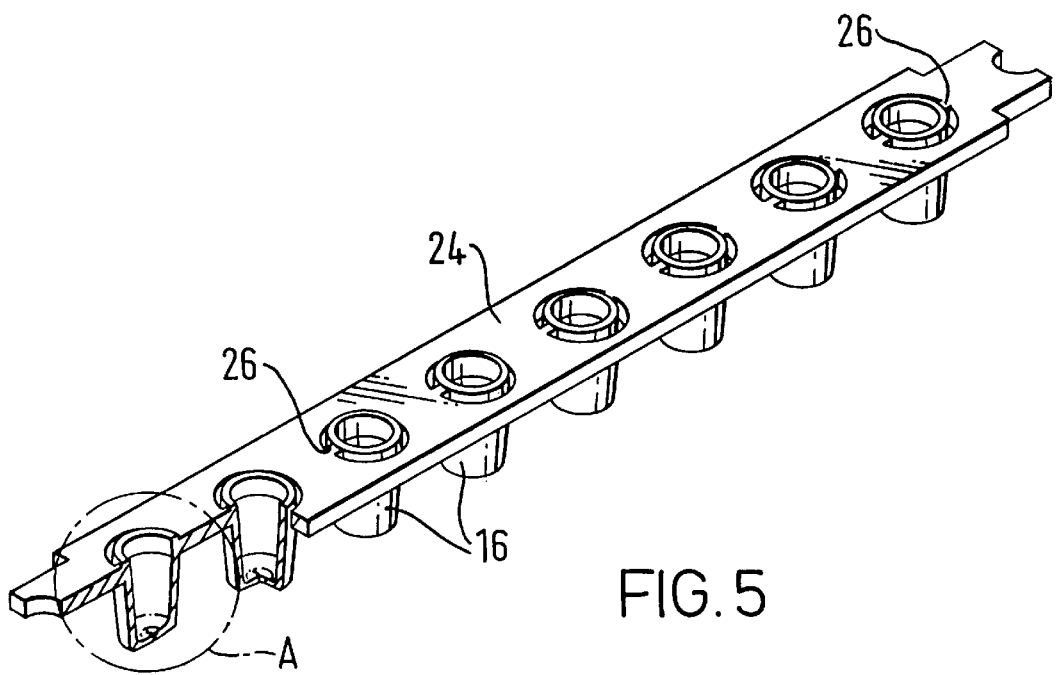
FIG. 5 is a perspective view of a plurality of wells containing solid supports from the system of FIG. 3.

Referring to FIGS. 5 and 5A–5C, construction of wells 16 to facilitate the separation of liquids from the beads will be described in greater detail. As shown in FIG. 5, the wells may conveniently be provided in a strip 24, with eight wells being included in each strip. Wells 16 are preferably connected to strip 24 at tabs 26 so that wells 16 may be conveniently detached from strip 24 when needed.

Figure 5A:
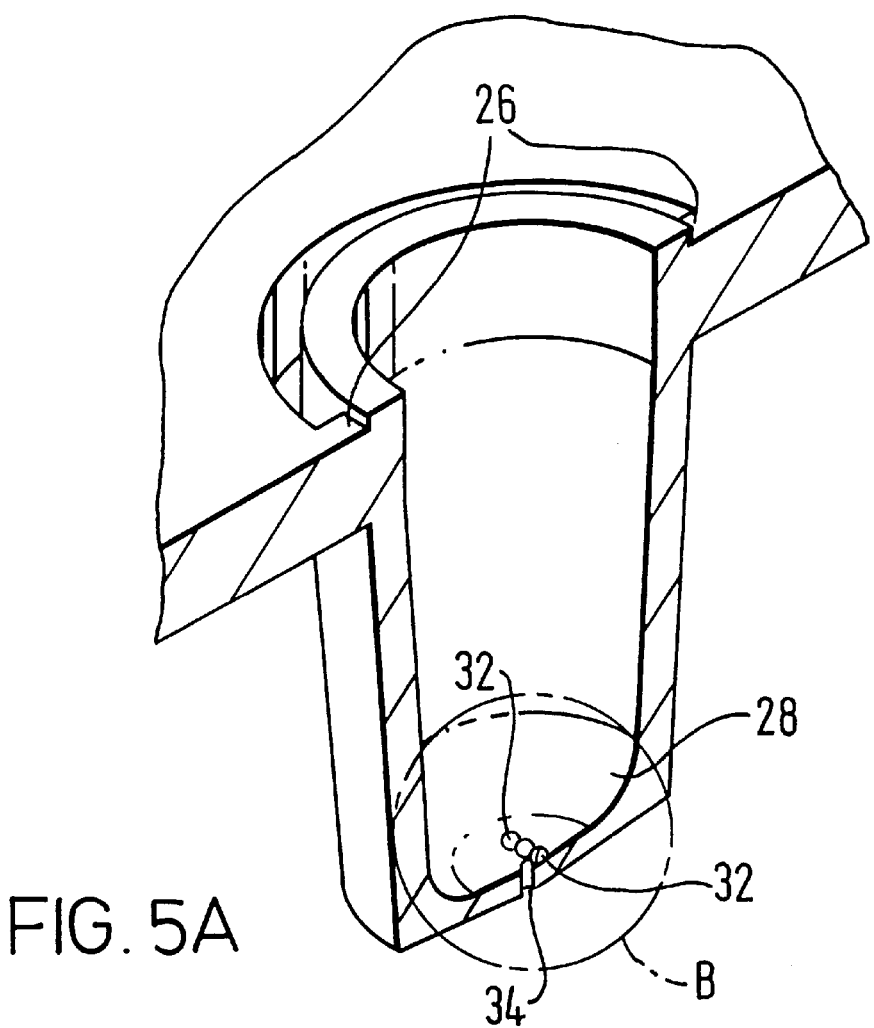
FIG. 5A is a more detailed view of one of the wells of FIG. 5 taken along lines A—A.
Figure 5B:
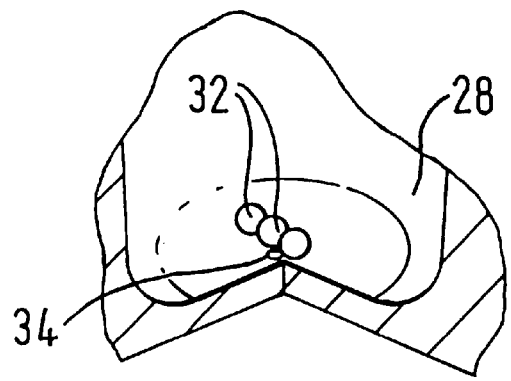
FIG. 5B is a more detailed view of a bottom end of the well of FIG. 5A taken along lines B—B.
Figure 5C:
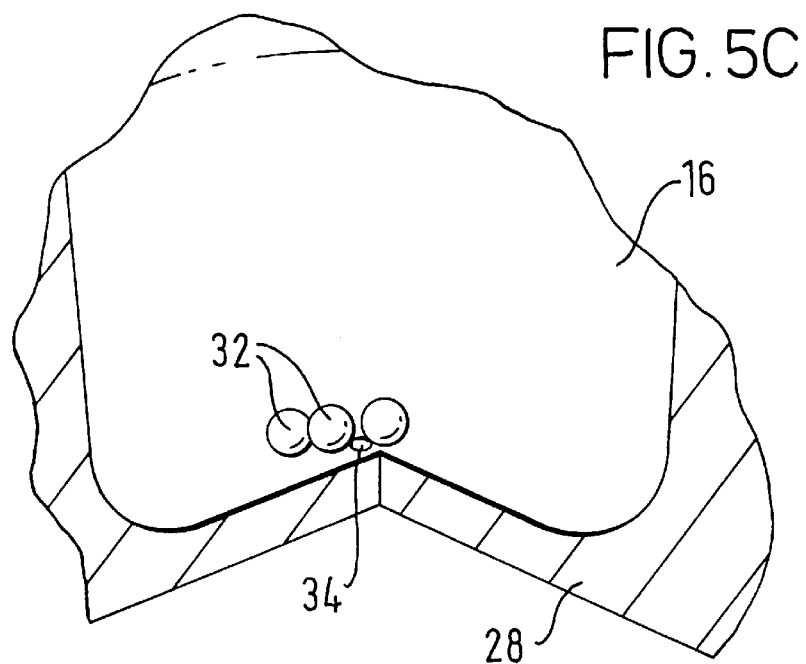
FIG. 5C is a more detailed view of the bottom end of the well of FIG. 5B showing a hole offset from the apex of the well bottom.

As best shown in FIGS. 5A–5C, each well 16 is tapered at a bottom end 28 to form an apex 30. In this manner, a plurality of beads 32 will tend to settle in bottom end 28 near apex 32. Laterally offset from apex 30 is a capillary hole 34 through which a liquid medium may be transferred into holding vessels 22 of bottom plate 14.

Capillary hole 34 will preferably be sized to be smaller than beads 32. The size of capillary hole 34 will also be configured such that it may hold a liquid medium within wells 16 by capillary forces when top plate 12 is at rest. Although the size of capillary hole 34 may greatly vary depending upon the type of liquid medium and the size of beads 32, one preferred diameter is in the range from about 80 μm to about 100 μm when beads 32 have a size in the range from about 150 μm to about 250 μm.

As best shown in FIG. 5C, capillary hole 34 is conveniently laterally offset from apex 30 so that beads 32 will not tend to settle over capillary hole 34, thereby preventing the liquid medium from being transferred through capillary hole 34. Although it is preferred to have only a single capillary hole 34, additional capillary holes may optionally be provided in bottom ends 28.

To draw the liquid medium through capillary hole 34, a centrifuge may be employed. In this manner, top plate 12 and bottom plate 14 may be spun at a rate which is sufficient to overcome the capillary forces and to draw the liquid medium from wells 16 into holding vessels 22. Alternatively, a vacuum may be provided at bottom ends 28 of wells 16 to draw the liquid into holding vessels 22.

Figure 5D:
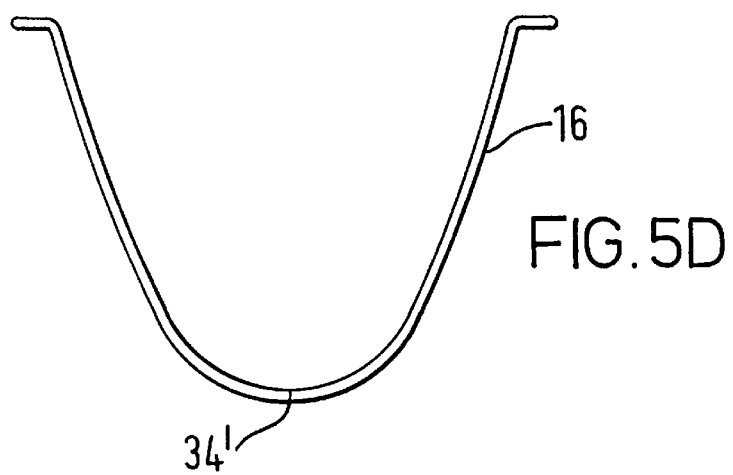
FIG. 5D is a cross sectional side view of an alternative well design having a transitory hole which remains closed until centrifuged.
Figure 5E:
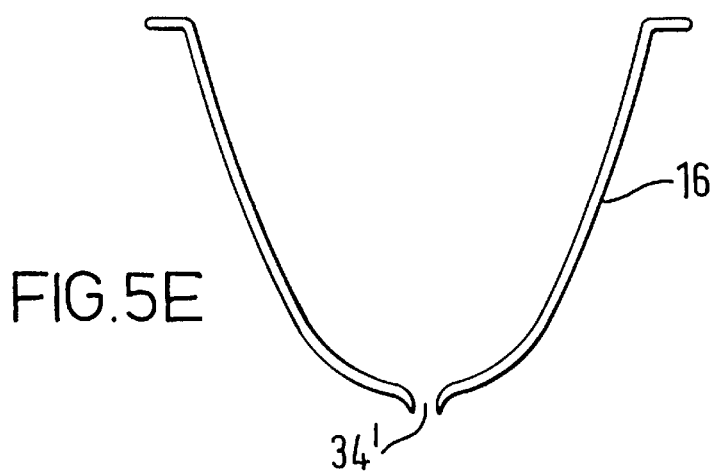
FIG. 5E illustrates the well of FIG. 5D when centrifuged to open the hole.

When employing a centrifuge or a vacuum, wells 16 may optionally be modified so that the capillary holes are configured to be transitory holes 34' as shown in FIGS. 5D and 5E. As illustrated in FIG. 5D, transitory holes 34' are normally biased closed. This is best accomplished by constructing bottom ends 28 of a flexible material which is normally biased toward the interior of wells 16. In this manner, holes 34' are normally closed to prevent fluids from draining. Upon centrifugation or application of a vacuum, holes 34' flex open as shown in FIG. 5E to allow transfer of the liquids. After centrifugation, holes 34' will again close.

Figure 5F:
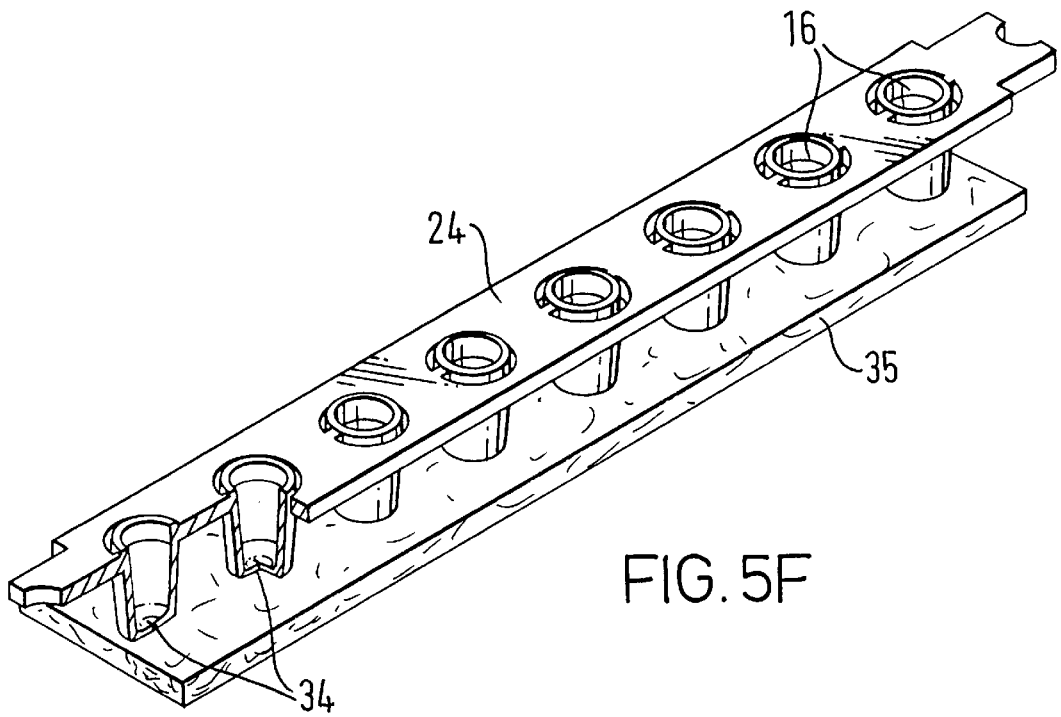
FIG. 5F illustrates the wells of FIG. 5 having an absorbable material placed in contact with the bottom ends to remove liquids from the wells.

As illustrated in FIG. 5F, liquids may be drained from wells 16 without the need for a centrifuge, vacuum manifold or other complex or expensive accessory. Instead, drainage may be accomplished by placing a strip of an absorbable material 35 in contact with bottom ends 28. The absorbable material will preferably have a capillary force which is higher than the capillarity of holes 34 so that liquids within the wells will be drawn by a wicking action into the absorbable material 35. Exemplary materials for the absorbable material comprise paper, glass fiber mat, synthetic fiber mat, polymer fibers, a polymer acrylic acid gel, or the like.

Another advantage of employing absorbable material 35 to remove the liquids is that the liquids may rapidly and easily be drained from the wells. This allows reagents, washing fluids, waste fluids and the like to be removed quickly so that the solid supports may be rapidly subjected to various fluids during the process of synthesis or compound removal, thereby making the system more conducive to quick assay protocols. Further, useful compounds may be wicked into an organized array or arrangement so that subsequent procedures may be performed using equipment compatible with samples in arrayed formats.

One particular advantage of providing capillary hole 34 in bottom end 28 is that substantially all of the liquid medium within wells 16 may be transferred into holding vessels 22. Since substantially all the liquid medium may be transferred without waste, the amount of liquid medium required to adequately perform the desired assays can be greatly reduced.

System 10 may be employed in a variety of ways to evaluate compounds synthesized on beads 32. For example, each well 16 may be provided with a single bead or with multiple beads. If a single bead is included in each well (and a portion of the compounds is released into a liquid medium), the liquid medium having the released compound may be transferred through capillary hole 34 into holding vessels 22. Assays may then be directly performed on the liquid medium within holding vessels 22. Since bottom plate 14 is configured to be compatible with commercial processing equipment, such assays may be rapidly and conveniently performed.

A similar process may also be employed if multiple beads are included in each well 16. If a positive result is identified in one of holding vessels 22, it may be concluded that one of beads 32 within the corresponding well 16 will have the bead containing the compound which produced the positive result. Separate assays may then be performed on those beads to evaluate the particular compound. In this way, throughput is increased since multiple beads may be analyzed at the same time.

Figure 6:
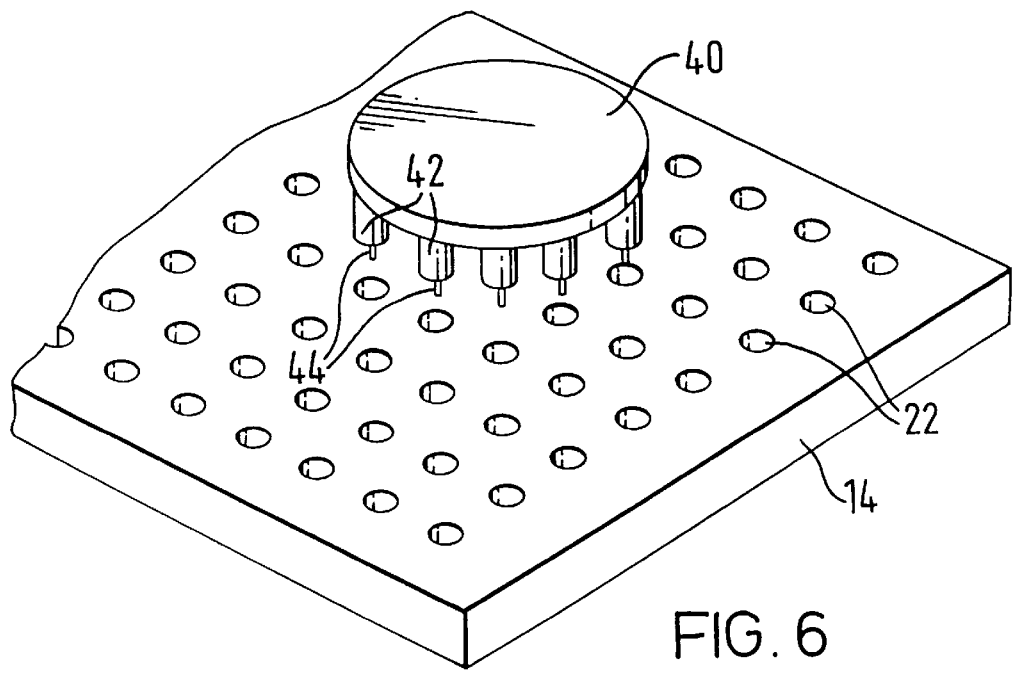
FIG. 6 illustrates a bottom plate of the system of FIG. 3 having a plurality of holding vessels and a pipetting system for transferring fluids from the holding vessels according to the present invention.
Figure 7:
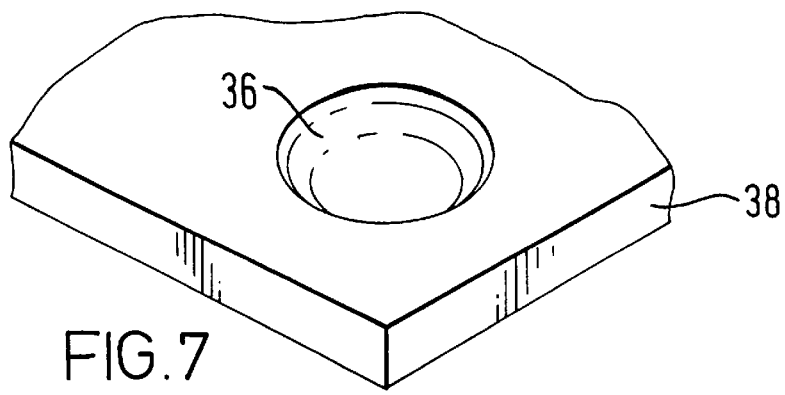
FIG. 7 is a perspective view of a plate having a reaction vessel for receiving liquids transported by the pipetting system of FIG. 6 according to the present invention.

To further increase the throughput of system 10, bottom plate 14 may be configured as an intermediate plate as illustrated in FIG. 6. In this manner, after the liquid medium is transferred into bottom plate 14 as previously described, top plate 12 is removed and the liquid medium is pooled into a separate reaction vessel 36 in a plate 38 as illustrated in FIG. 7. Assays may then be performed on the combined compound within reaction vessel 36 to see if a positive result is produced. A particular advantage of this method is that if a positive result is identified in reaction vessel 38, additional assays may be performed on the liquid medium remaining within holding vessels 22 of bottom plate 14. In this manner, additional beads will not need to be prepared with synthesized compounds in order to evaluate a particular compound.

To remove only a portion of the liquid medium from holding vessels 22, a pipetting system 40 is provided as shown in FIG. 6. Pipetting system 40 includes a plurality of pipettes 42 which each include a capillary tube 44 at a distal end. As shown, system 40 includes nine pipettes 42 so that the liquid medium within nine holding vessels 22 may be pooled within reaction vessel 36. However, it will be appreciated that the number of pipettes 42 may vary depending on the particular application. Capillary tubes 44 are advantageous in that a known quantity of the liquid medium will be drawn into each capillary tube so that a known volume of liquid from each holding vessel 22 may be transferred into reaction vessel 36.

Reaction vessel 36 will be useful when either a single bead or multiple beads are placed within wells 16 and the compounds released. For example, if a single bead is provided in each well and a positive result is produced in reaction vessel 36, assays may then be performed on the liquid medium remaining within the nine holding vessels 22 from which the combined liquid was pooled. In this way, the compound may be identified by noting which holding vessel 22 produces a positive result.

If multiple beads 32 are included in each well and a positive result is identified in reaction vessel 36, assays may then be performed on the liquid medium held within the nine holding vessels 22 from which the combined liquid was pooled. If a positive result is produced in one of holding vessels 22, separate assays will need to be performed on the compounds included on each bead placed in the corresponding well 16.

Figure 8:
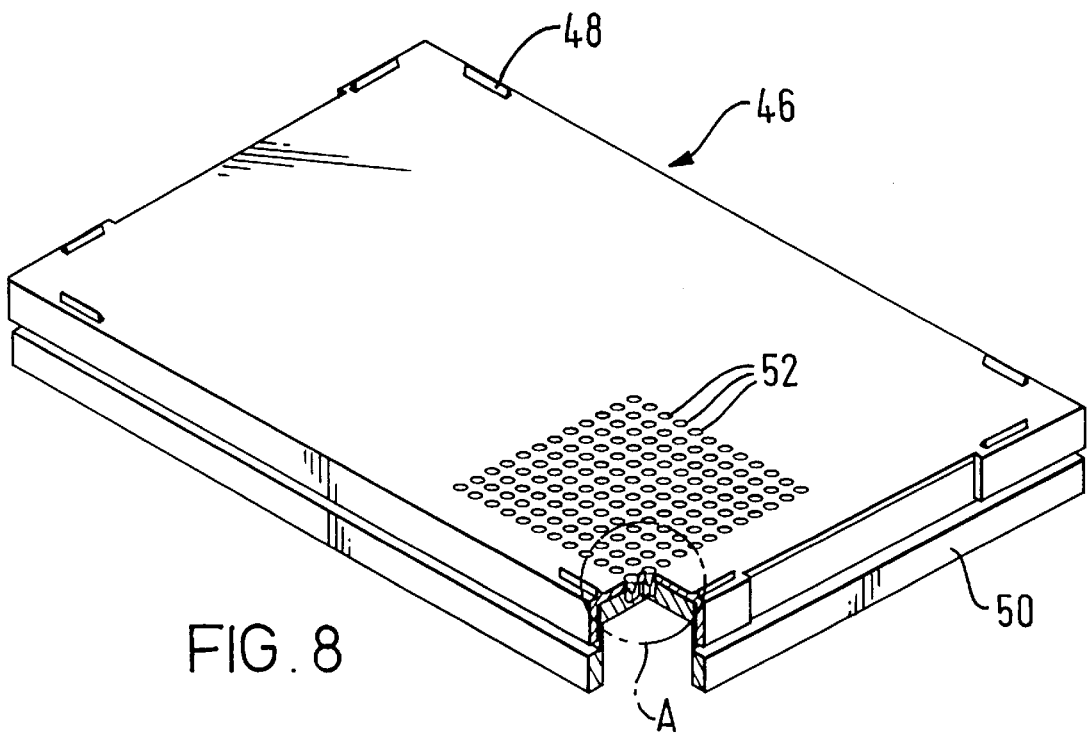
FIG. 8 is a perspective view of an alternative system for separating fluids from solid supports according to the present invention.

Referring now to FIG. 8, an alternative system 46 for separating a liquid medium from beads will be described. System 46 includes a top plate 48 and a bottom plate 50. Similar to system 10, plates 48 and 50 are configured to be compatible with commercially available process and handling equipment. Top plate 48 includes 864 wells 52 (only a portion of which are illustrated). Alternatively, other numbers of wells 52 may be included in top plate 48, such as by including 96 wells. Further, different shapes and sizes of plates may be possible.

Figure 8A:
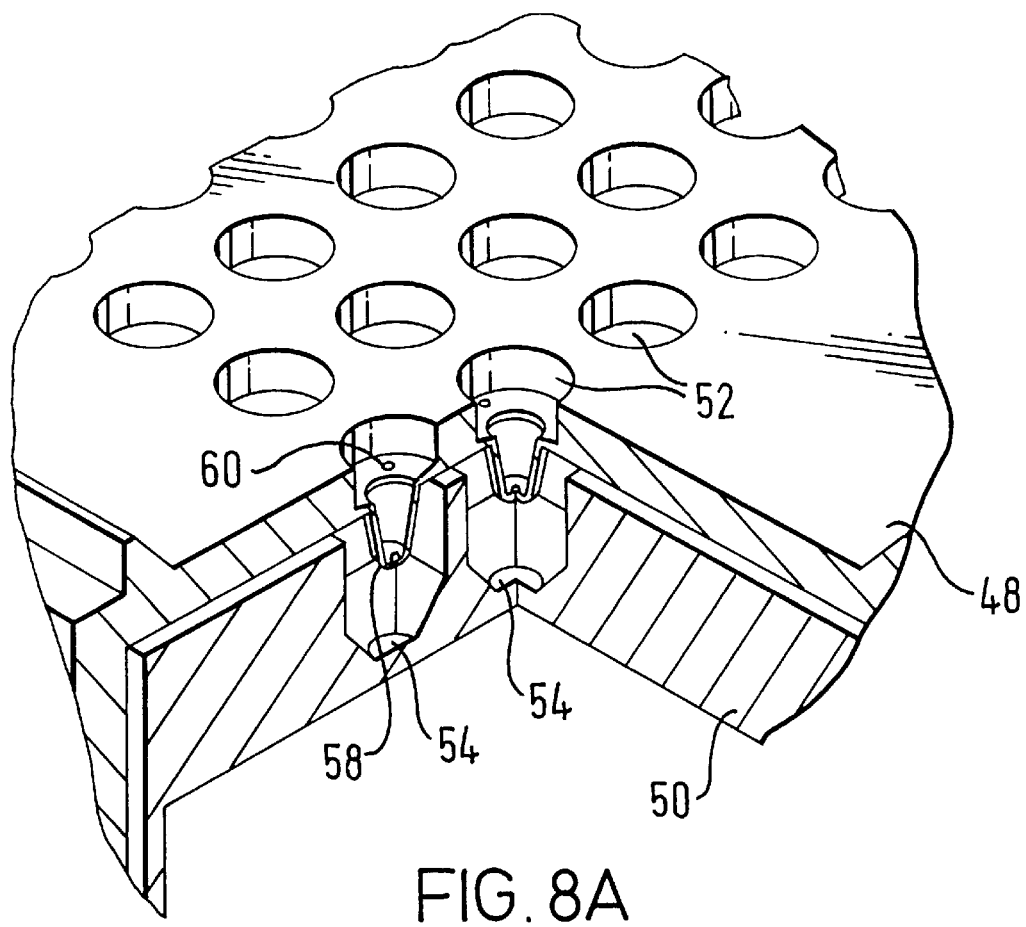
FIG. 8A is a more detailed view of the system of FIG. 8 taken along lines A—A.
Figure 8B:
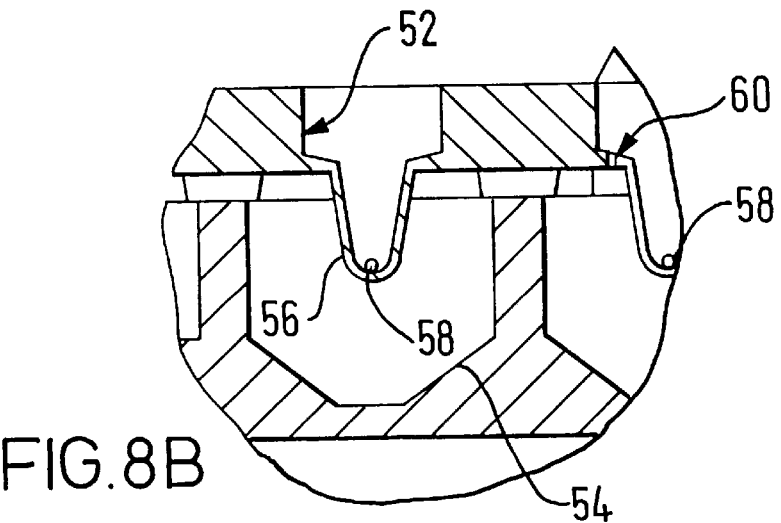
FIG. 8B is a cross-sectional side view of a well and a holding vessel of the system of FIG. 8A.

As best shown in FIGS. 8A and 8B, each well 52 in top plate 48 is aligned with and received into a corresponding holding vessel 54 in bottom plate 50. Top plate 48 rests on bottom plate 50 so that the plates may be separated to perform assays on a liquid medium transferred from wells 52 to holding vessels 54.

Each well 52 includes a curved bottom end 56 into which beads 58 may be placed. As described hereinafter, each well 52 may receive either a single bead or a plurality of beads. Included on the side of each well 52 is a capillary hole 60. Capillary hole 60 may be configured with the same dimensions as capillary hole 34 of system 10 as previously described. An advantage of placing capillary hole 60 on the side of well 52 is that only a portion of the liquid medium contained in each well may be transferred into holding vessels 54. In this manner, if a positive result is produced when performing assays on the liquid medium within holding vessels 54, a portion of the liquid medium having the released compound will remain within wells 52 so that additional assays may be performed to evaluate the specific compound. This procedure will be most useful when multiple beads 58 are included in each well 52. To transfer a liquid medium through capillary hole 60, plates 48 and 50 may be spun to centrifuge a portion of the liquid medium from wells 52 and into holding vessels 54.

Figure 9:
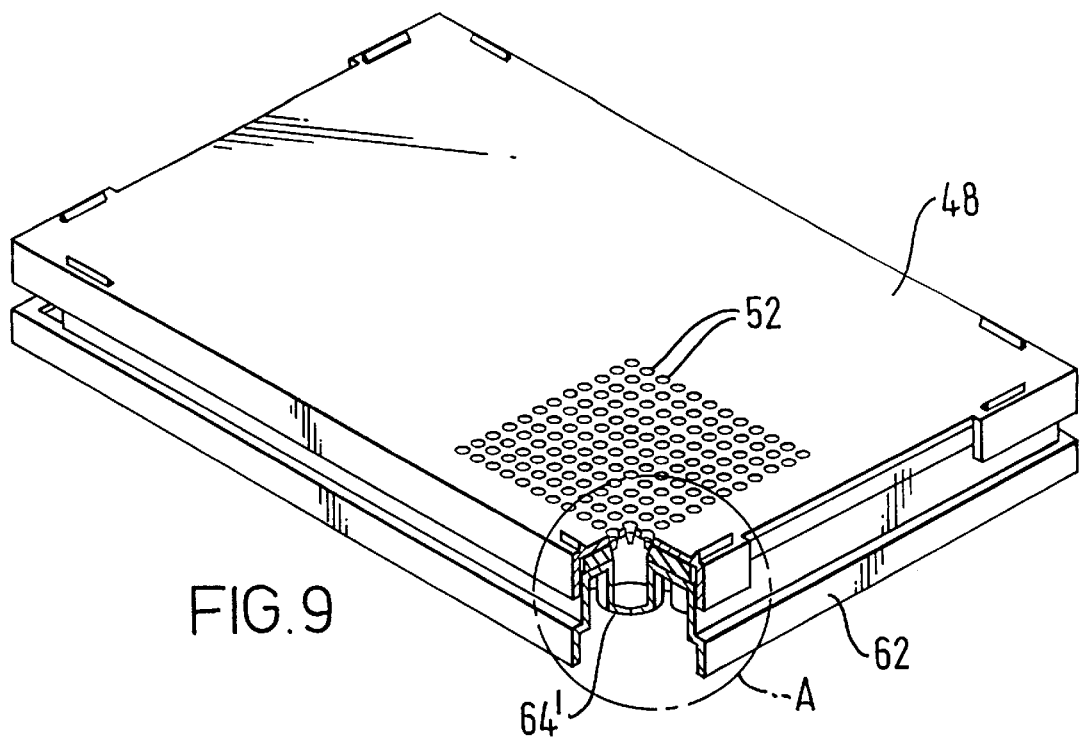
FIG. 9 is a perspective view of still another alternative system for separating fluids from solid supports according to the present invention.
Figure 9A:
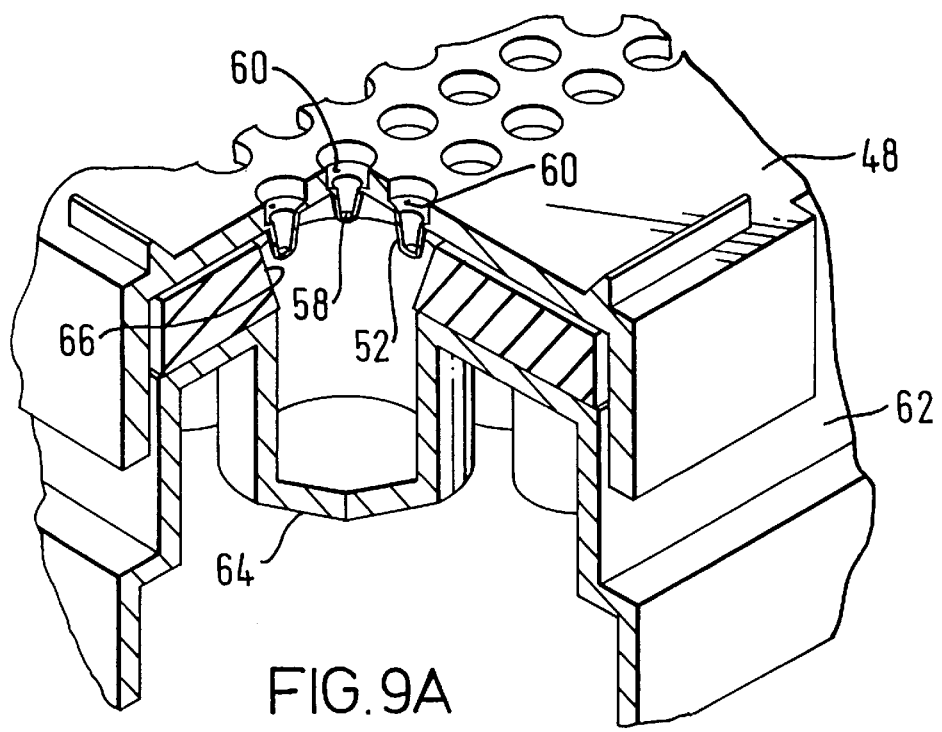
FIG. 9A is a more detailed view of the system of FIG. 9 taken along lines A—A.

Referring to FIGS. 9 and 9A, system 46 may be modified so that top plate 48 rests upon a bottom plate 62 having ninety-six holding vessels 64. Conveniently, a spacer plate 66 is provided between top plate 48 and bottom plate 62 to appropriately space the distance between wells 52 and holding vessels 64. Spacer plate 66 also serves to channel fluids from wells 52 into holding vessels 64. As shown, each holding vessel 64 is aligned with nine wells 52 so that the liquid medium contained within the nine wells may be pooled into a single holding vessel. Assays may then be performed upon the pooled liquid within the holding vessels 64. If a positive result is produced, the liquid remaining within wells 52 may be further analyzed to evaluate the compound as previously described. In this manner, a high throughput system is provided since the compound from multiple beads may be evaluated in a single step. Further, since a portion of the liquid medium is maintained within wells 52, additional assays may be performed without having to separately release additional compounds from the beads.

Figure 10:
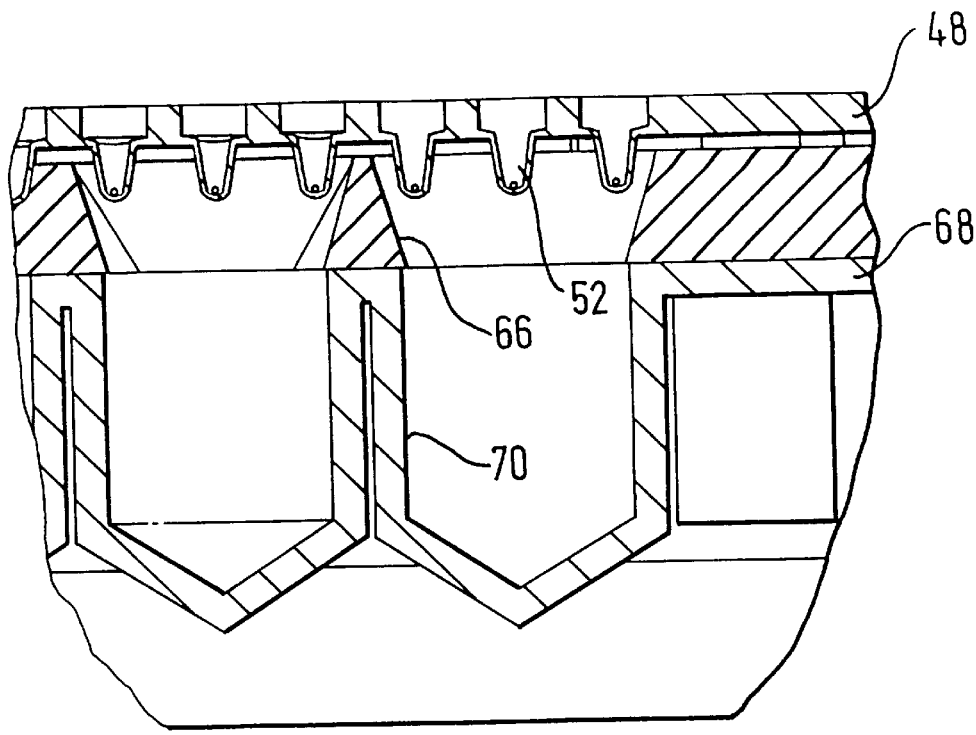
FIG. 10 is a cross-sectional side view of a portion of an alternative bottom plate which may be used with the system of FIG. 9.

Top plate 48 may alternatively be employed with bottom plates having holding vessels with a variety of configurations. One such bottom plate 68 is illustrated in FIG. 10. Top plate 48 includes wells which may be removed from plate 48 to facilitate handling and testing. The V-shape in the bottom of holding vessel 70 is advantageous for retrieving all of the liquid.

Figure 11:
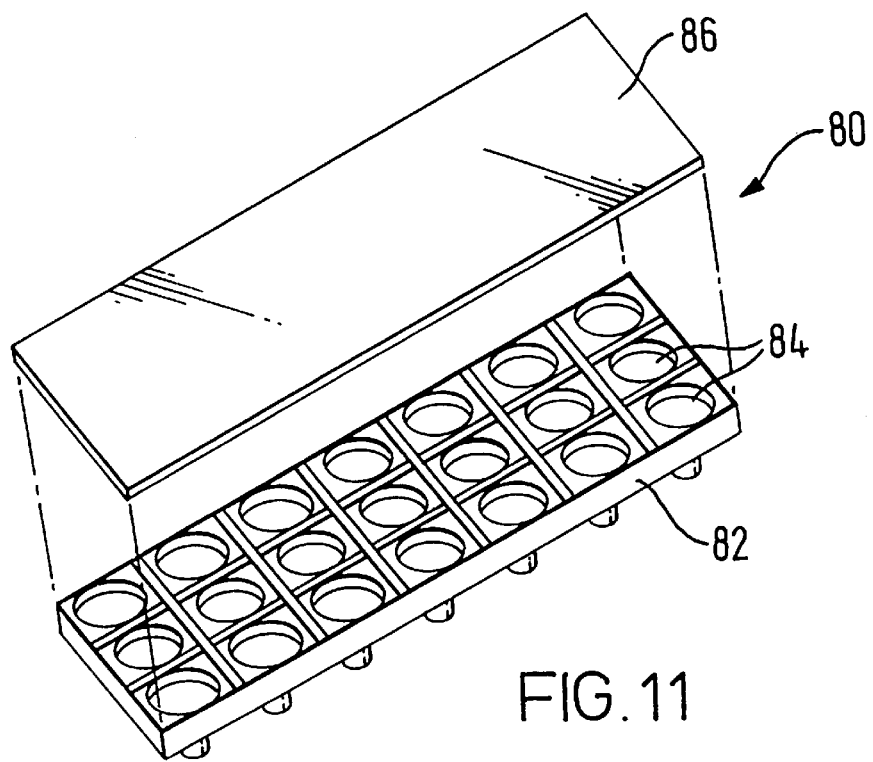
FIG. 11 illustrates an exemplary process for constructing well plates having capillary holes therein according to the invention.

Referring now to FIG. 11, an exemplary system 80 and process for rapidly and inexpensively constructing a multi-well plate having capillary holes therein (such as with wells 16 and holes 34) will be described. System 80 comprises a rack 82 which holds a plurality of test tubes 84. Rack 82 may be constructed from, for example, an insert from a box of microliter pipette tips. Tubes 84 may be any size of commercially available test tube, such as, for example, 0.5 ml polypropelene test tubes. Tubes 84 are placed into rack 82 as shown and a sheet of plastic 86 is placed on top of tubes 84. Sheet 86 is then softened with heat and a commercially available vacuum mold (not shown) is employed to draw sheet 86 into the mold.

Holes may be formed in each well by punching, such as with a 30 gauge needle, by securing an upwardly pointing needle within each tube 84 before the vacuum is drawn, or the like. Such a procedure relatively quickly produces a multi-well plate with capillary holes without the need for employing an expensive injection mold. Further, since raw materials are cheaper, being only a sheet of plastic, the cost per plate is also reduced.

The invention has now been described in detail. However, it will be appreciated that certain changes and modifications may be made. Therefore, the scope and content of this invention are not limited by the foregoing description.

Rather, the scope and content are to be defined by the following claims.

What is claimed is:

1. A method for combining distinct chemical compositions with reagents, the method comprising:

providing a plurality of solid supports having the chemical compositions thereon;

organizing the solid supports having the chemical compositions thereon into separate regions of a donor member so that each region includes a distinct chemical composition, wherein the donor member regions each include a liquid medium, wherein the donor member regions each have a bottom end with a hole extending therethrough, and wherein the bottom ends slope toward the holes;

releasing at least some of the chemical compositions from their solid supports and into the liquid medium while within the donor member regions;

applying centrifugation to the donor member to systematically transfer at least some of the liquid medium containing the released chemical compositions through the holes and into individual locations within an acceptor member such that the locale of each transferred chemical composition within the acceptor member is known, and wherein the individual locations define a volume that is less than about 500 µl; and introducing a reagent to each location having one of the chemical compositions.

2. A method as in claim 1, further comprising maintaining the solid supports within the donor member regions while transferring the released chemical compositions to the acceptor member locations.

3. A method as in claim 1, wherein the same reagent is delivered to each location.

4. A method as in claim 1, wherein the acceptor ember includes at least four locations per square centimeter.

5. A method as in claim 1, wherein the donor member regions each have a volume that is less than about 500 µl.

6. A method as in claim 1, wherein the donor member regions and the acceptor member regions are organized into two dimensions arrays.

7. A method as in claim 6, further comprising aligning the donor member regions with the acceptor member regions before transferring the chemical compositions.

8. A method as in claim 7, wherein more than one donor member region is aligned with a single acceptor member location.

9. A method for combining distinct chemical compositions with reagents, the method comprising:

providing a plurality of solid supports, with each solid support having a chemical composition thereon;

organizing the solid supports into separate donor chambers that are included within a housing so that each donor chamber includes a distinct chemical composition, wherein at least some of the donor chambers include a hole and are sloped toward the hole;

releasing at least some of the chemical compositions from their solid supports into a liquid medium held within the donor chambers;

systematically transferring at least some of the liquid medium containing the released chemical compositions to acceptor chambers that are included within a housing such that the locale of each transferred chemical composition within the acceptor member is known, wherein the transferring step comprises spinning the housings containing the donor chambers and the acceptor chambers to move the liquid medium containing the released chemical compositions through the holes of the donor chambers and into the acceptor chambers, and wherein the acceptor chambers define a volume that is less than about 500 µl; and introducing a reagent to each acceptor chamber having one of the chemical compositions.

10. A method as in claim 9, further comprising transferring reagents from an acceptor chamber into another acceptor chamber or one of the donor chambers.

* * * * *